D. H. HIGGINS.
CORN POPPER.
APPLICATION FILED NOV. 2, 1908.
937,372.
Patented Oct. 19, 1909.
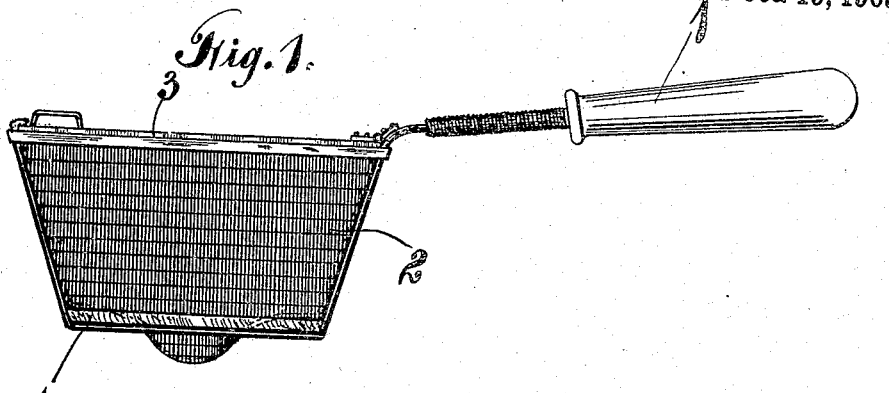
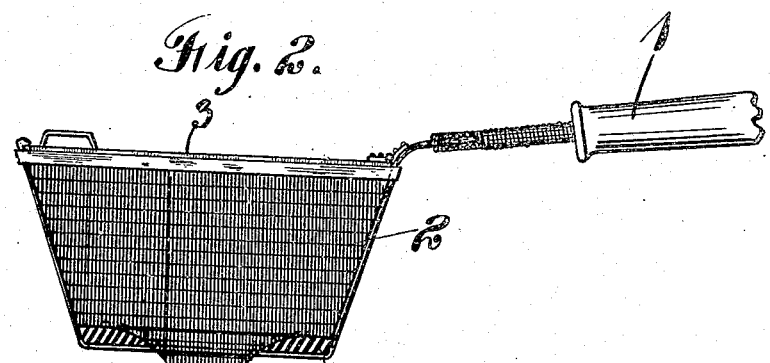
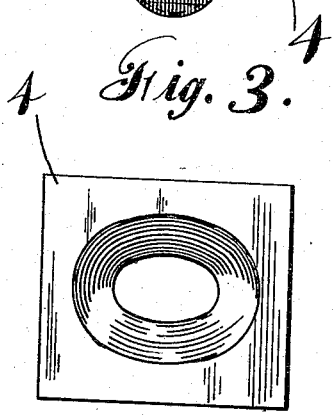
Witnesses
David J. Solari
Inventor
DAVID H. HIGGINS
By Medina and Griffin
Attorneys

UNITED STATES PATENT OFFICE.

DAVID H. HIGGINS, OF OAKLAND, CALIFORNIA.

CORN-POPPER.

937,372.  Specification of Letters Patent.  Patented Oct. 19, 1909.

Application filed November 2, 1908. Serial No. 460,590.

*To all whom it may concern:*

Be it known that I, DAVID H. HIGGINS, a citizen of the United States, residing at Oakland, in the county of Alameda and State of California, have invented a new and useful Corn-Popper, of which the following is a specification in such full and clear terms as will enable those skilled in the art to construct and use the same.

This invention relates to a device used for the purpose of popping corn over a fire, and the object of the invention is to pop the corn without blacking the same, and without burning the same. The common wire corn popper allows all the smoke from the fire to pass up through the mass of corn, both popped and unpopped, and the result is that the popped corn is blackened from the smoke and is often burned before all the grains are popped.

This invention is intended to provide means to prevent the corn in the popper from coming into contact with the flame after it has been popped, and to prevent the corn that is to be popped from moving off to one side of the popper and getting out of the fire.

In the drawing, in which the same numeral of reference is applied to the same portion throughout, Figure 1 is a side elevation of a corn popper which has the invention applied thereto, Fig. 2 is a sectional view in the central plane of the popper, and Fig. 3 is a plan view of the mat used to protect the corn.

The numeral 1 is applied to the handle of the corn popper 2, which is made of the usual wire screen, the top 3 being hinged to the basket at the end on which the handle is secured. The bottom of the basket has a depression therein which makes an incline in all directions from the sides of the basket, the depression passing through a hole in an asbestos mat 4 which is secured to the bottom of the basket, the object of the mat being to prevent the fire from touching any corn save the unpopped corn which runs down the inclined sides of the basket and drops into the depression at the center. The popped corn flies up when it pops, and since it does not roll as the unpopped kernels do it stays on the mat, and is protected from the fire, thus preventing it from being scorched and also preventing it from being blackened by the smoke, in fact the corn popped is very much whiter than when carefully popped in the ordinary way in an open meshed basket.

Having thus described my invention what I claim as new and desire to secure by Letters Patent of the United States is as follows:

1. In a corn popper, a wire basket having a depressed portion near the center of the bottom thereof, and means to prevent the heat from passing through the basket around the depressed portion thereof, as set forth.

2. In a corn popper, a basket having a depressed portion near the center of the bottom thereof, and a non-conducting mat having an opening therein through which said depressed portion of the basket extends, as set forth.

3. In a corn popper, a basket having a depressed portion near the center of the bottom thereof the remaining portion of the bottom inclining downwardly toward said depressed portion, and an asbestos mat having a hole therein near the center thereof and through which the depressed portion of the bottom extends, as set forth.

In testimony whereof I have set my hand this 24th day of October A. D. 1908, in the presence of the two subscribed witnesses.

DAVID H. HIGGINS.

Witnesses:
 W. T. HESS,
 C. P. GRIFFIN.